(12) United States Patent  (10) Patent No.: US 8,277,369 B2
West et al.  (45) Date of Patent: Oct. 2, 2012

(54) BEARING AND BEARING ASSEMBLY FOR UMBILICUS OF A FLUID PROCESSING SYSTEM

(75) Inventors: Richard L. West, Lake Villa, IL (US);
Mark B. Jones, Libertyville, IL (US);
Salvatore Manzella, Jr., Barrington, IL (US)

(73) Assignee: Fenwal, Inc., Lake Zurich, IL (US)

( * ) Notice: Subject to any disclaimer, the term of this patent is extended or adjusted under 35 U.S.C. 154(b) by 198 days.

(21) Appl. No.: 12/815,634

(22) Filed: Jun. 15, 2010

(65) Prior Publication Data

US 2011/0306913 A1 Dec. 15, 2011

(51) Int. Cl.
*B04B 7/00* (2006.01)
(52) U.S. Cl. .............................. 494/18; 494/83; 384/300
(58) Field of Classification Search .................. 494/7.35, 494/21, 45, 83, 17–18, 84; 210/380.1, 380.3, 210/781, 782; 138/111; 384/300
See application file for complete search history.

(56) References Cited

U.S. PATENT DOCUMENTS

| | | | |
|---|---|---|---|
| 2,983,639 A | 5/1961 | Jageman | |
| 3,678,964 A | 7/1972 | Andrews | |
| 3,861,972 A | 1/1975 | Glover et al. | |
| 3,986,442 A | 10/1976 | Khoja | |
| 4,056,224 A | 11/1977 | Lolachi | |
| 4,108,353 A | 8/1978 | Brown | |
| 4,109,852 A | 8/1978 | Brown | |
| 4,109,854 A | 8/1978 | Brown | |
| 4,109,855 A | 8/1978 | Brown | |
| 4,113,173 A | 9/1978 | Lolachi | |
| 4,114,802 A | 9/1978 | Brown | |
| 4,120,449 A | 10/1978 | Brown et al. | |
| 4,164,318 A | 8/1979 | Boggs | |
| 4,194,684 A | 3/1980 | Boggs | |
| 4,221,322 A | 9/1980 | Drago et al. | |
| 4,230,263 A | 10/1980 | Westberg | |
| 4,245,383 A | 1/1981 | Boggs | |
| 4,261,507 A | 4/1981 | Baumler | |
| 4,344,560 A | 8/1982 | Iriguchi et al. | |
| 4,372,484 A | 2/1983 | Larsson | |
| 4,389,206 A | 6/1983 | Bacehowski et al. | |
| 4,425,112 A | 1/1984 | Ito | |
| 4,439,178 A * | 3/1984 | Mulzet ........................... 494/85 |
| 4,440,195 A | 4/1984 | Van Dongeren | |
| 4,459,169 A | 7/1984 | Bacehowski | |
| 4,517,404 A | 5/1985 | Hughes et al. | |
| 4,522,188 A | 6/1985 | Houghton et al. | |
| 4,540,397 A | 9/1985 | Lolachi et al. | |

(Continued)

OTHER PUBLICATIONS

Extended European Search Report for European Patent Appln. No. 11 00 4872, dated Jul. 12, 2012.

*Primary Examiner* — Charles E Cooley
(74) *Attorney, Agent, or Firm* — Cook Alex Ltd.

(57) ABSTRACT

A one-piece bearing is provided for use with a fluid processing assembly of the type having an umbilicus, a bearing support, a gimbal received within the bearing support, and a liner at least partially received within the gimbal. The bearing is secured to a midsection of the umbilicus and adapted to be at least partially received within the liner. An inner surface of the bearing engages the umbilicus while an outer surface of the bearing engages at least a portion of the liner for rotation relative to the liner.

20 Claims, 9 Drawing Sheets

U.S. PATENT DOCUMENTS

| | | |
|---|---|---|
| 4,636,346 A | 1/1987 | Gold et al. |
| 4,710,161 A | 12/1987 | Takabayashi |
| 4,778,444 A | 10/1988 | Westberg et al. |
| 4,865,081 A | 9/1989 | Neumann |
| 4,950,401 A | 8/1990 | Unger et al. |
| 5,097,870 A | 3/1992 | Williams |
| 5,118,207 A | 6/1992 | Ikejiri et al. |
| 5,160,310 A | 11/1992 | Yhland |
| 5,305,799 A | 4/1994 | Dal Palu |
| 5,362,291 A | 11/1994 | Williamson, IV |
| 5,514,069 A | 5/1996 | Brown et al. |
| 5,551,942 A | 9/1996 | Brown et al. |
| 5,558,448 A | 9/1996 | Yabe et al. |
| 5,575,570 A | 11/1996 | Uchiyama et al. |
| 5,772,159 A | 6/1998 | Wendt |
| 5,989,177 A * | 11/1999 | West et al. ............ 494/46 |
| 5,996,634 A * | 12/1999 | Dennehey et al. ............ 138/109 |
| 6,344,020 B1 * | 2/2002 | Reitz et al. ............ 494/46 |
| 8,216,120 B2 * | 7/2012 | Aitkenhead et al. ............ 494/45 |
| 2011/0303316 A1 * | 12/2011 | Manzella et al. ............ 138/106 |
| 2011/0306913 A1 * | 12/2011 | West et al. ............ 604/5.01 |

* cited by examiner

FIG. 16 ed in detail in U.S. Pat. No. 4,120,449 to
BEARING AND BEARING ASSEMBLY FOR UMBILICUS OF A FLUID PROCESSING SYSTEM

BACKGROUND

1. Field of the Disclosure

The present subject matter relates to a bearing and bearing assembly for supporting an umbilicus used, for example, in a fluid processing system.

2. Description of Related Art

Whole blood is routinely separated into its various components, such as red blood cells, platelets, and plasma. In typical blood processing systems, whole blood is drawn from a donor, the particular blood component or constituent is removed and collected, and the remaining blood constituents are returned to the donor. By thus removing only particular constituents, less time is needed for the donor's body to return to normal, and donations can be made at more frequent intervals than when whole blood is collected. This increases the overall supply of blood constituents, such as plasma and platelets, made available for health care.

Whole blood is typically separated into its constituents through centrifugation. This requires that the whole blood be passed through a centrifuge after it is withdrawn from, and before it is returned to, the donor. To avoid contamination, the blood is usually contained within a sealed, sterile system during the entire centrifugation process. Typical blood processing systems thus include a permanent, reusable centrifuge assembly or "hardware" that spins and pumps the blood, and a disposable, sealed and sterile fluid processing or fluid circuit assembly that actually makes contact with the donor's blood. The centrifuge assembly engages and spins a portion of the fluid processing assembly (often called the centrifuge or separation chamber) during a collection procedure. The blood, however, makes actual contact only with the fluid processing assembly, which is used only once and then discarded.

To avoid the need for rotating seals, and to preserve the sterile and sealed integrity of the fluid processing assembly, blood processing systems often utilize centrifuges that operate on the "one-omega, two-omega" operating principle. This principle is disclosed in detail in U.S. Pat. No. 4,120,449 to Brown et al., which is hereby incorporated by reference, and enables centrifuges to spin a sealed, closed system without the need for rotating seals and without twisting the components of the system. Blood processing systems that make use of the principle typically include a fluid processing assembly that includes a plastic bag or molded chamber that is spun in the centrifuge and that is connected to the blood donor and to a stationary portion of the centrifuge assembly through an elongated member that may be made up of one or more plastic tubes. The elongated member is commonly referred to as an "umbilicus" and is typically arranged in a question mark (or upside-down question mark) configuration with both of its end portions coaxially aligned with the axis of rotation of the centrifuge. The centrifuge chamber is rotated at "two-omega" RPM and the umbilicus is orbited around the centrifuge chamber at "one-omega" RPM. In other words, one end of the umbilicus is stationary, the other end rotates at a two-omega speed with the centrifuge chamber to which it is attached, and the intermediate portion or midsection of the umbilicus orbits about the chamber at a one-omega speed. The effect is that the end of the umbilicus, which is opposite the bag or chamber and is connected to the donor via plastic tubing, does not twist up as the bag is spun. The sealed, sterile integrity of the fluid processing assembly is thus maintained without the need for rotating seals.

U.S. Pat. Nos. 5,989,177 to West et al. and 6,344,020 to Reitz et al., both of which are hereby incorporated herein by reference, disclose one such blood processing apparatus based on the "one-omega, two-omega" operating principle. In this apparatus, a disposable fluid processing assembly having an umbilicus and a processing chamber is mountable within a centrifuge assembly. One end of the umbilicus is held rotationally stationary substantially coaxial with the axis of centrifugal rotation. The other end of the umbilicus joins the processing chamber and rotates with the processing chamber around the axis of centrifugation at the two-omega speed, up to about 3,000 RPM. The mid-portion of the umbilicus is supported by a wing plate that rotates around the axis of centrifugation at the one-omega speed, up to about 1,500 RPM. A thrust bearing mounted on the umbilicus permits the umbilicus to rotate relative to the wing plate as the wing plate and the processing chamber turn at different speeds. The thrust bearing slides into a one piece gimbal mounted in a recess provided on the wing plate. The gimbal helps keep the fluid processing assembly properly positioned during the centrifugation procedure. When the procedure is completed, the thrust bearing can be slid out of the gimbal in the wing plate to permit removal of the fluid processing assembly.

Prior thrust bearings employ a plurality of ball bearings to facilitate relative rotation between the umbilicus and wing plate. While such systems have proven suitable, they require a number of precision components to accommodate the ball bearings, and there remains a need for an improved and preferably lower cost bearing or bearing assembly for such processing systems, particularly that don't employ ball bearing arrangements.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a fluid processing assembly of the type having a bearing support and a gimbal assembly received within the bearing support is provided. The fluid processing assembly further includes an umbilicus having first and second ends and a one-piece thrust bearing secured to the umbilicus at a location between the ends. The bearing is adapted to be at least partially received within the gimbal assembly. The bearing includes an inner lumen through which the umbilicus extends and an outer surface adapted to engage at least a portion of the gimbal assembly for rotation relative to the gimbal assembly.

In another aspect, a fluid processing assembly of the type having a bearing support and a gimbal assembly received within the bearing support is provided. The gimbal assembly is of the type having an inner surface comprising an axially-extending wall generally coaxial with a central axis of the gimbal assembly and a radially-extending wall extending generally away from the central axis of the gimbal assembly. The fluid processing assembly further includes an umbilicus having first and second ends and a one-piece thrust bearing secured to the umbilicus at a location between the ends. The bearing is adapted to be at least partially received within the gimbal assembly and includes an inner lumen through which the umbilicus extends and an outer surface adapted to engage at least a portion of the gimbal assembly for rotation relative to the gimbal assembly. The outer surface of the bearing comprises an axially-extending bearing surface adapted to engage at least a portion of the axially-extending wall of the gimbal assembly and a radially-extending bearing surface adapted to engage at least a portion of the radially-extending wall of the gimbal assembly.

DESCRIPTION OF THE ILLUSTRATED EMBODIMENTS

The embodiments disclosed herein are for the purpose of providing the required description of the present subject matter. They are only exemplary, and may be embodied in various forms and in various combinations. Therefore, specific details disclosed herein are not to be interpreted as limiting the subject matter as defined in the accompanying claims.

Figure 1:
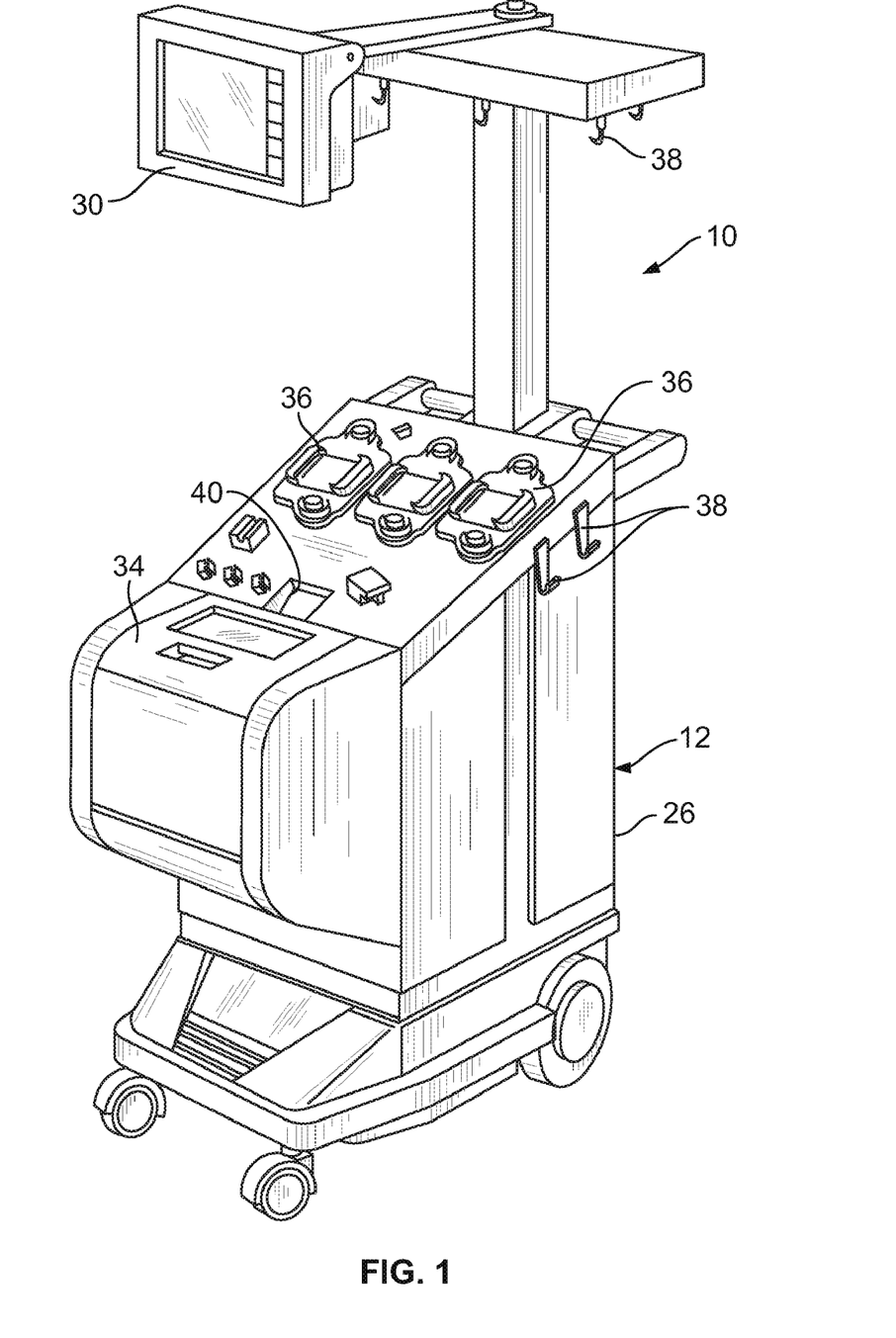
FIG. 1 is a perspective view of an exemplary durable fluid processing system in which bearing assemblies according to the present disclosure may be employed.

FIG. 1 shows a centrifugal fluid processing system 10 that may be used in combination with an umbilicus bearing assembly according to the present disclosure. The system is currently marketed as the AMICUS® separator by Fenwal, Inc. of Lake Zurich, Ill. The system 10 can be used for processing various fluids, but is particularly well suited for processing whole blood, blood components, or other suspensions of biological cellular materials. The system 10 includes a centrifuge assembly 12 for separating a fluid into its constituent parts. A more detailed description of the centrifuge assembly 12 and the other elements of the system 10 can be found in U.S. Pat. No. 5,996,634, which is incorporated by reference herein.

Figure 2:
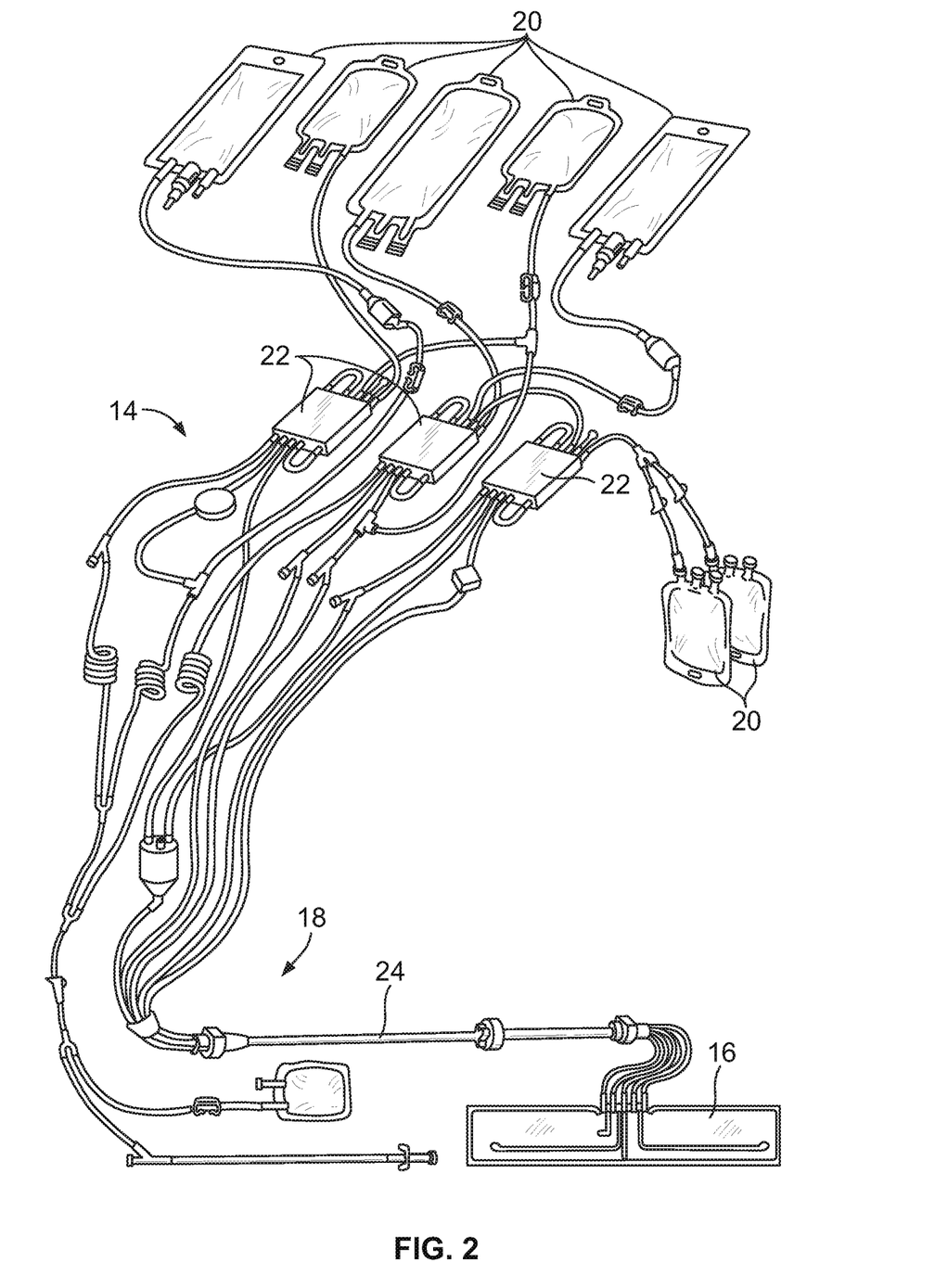
FIG. 2 is a perspective view of a disposable fluid processing or fluid circuit assembly usable in association with the durable fluid processing system of FIG. 1.
Figure 3:
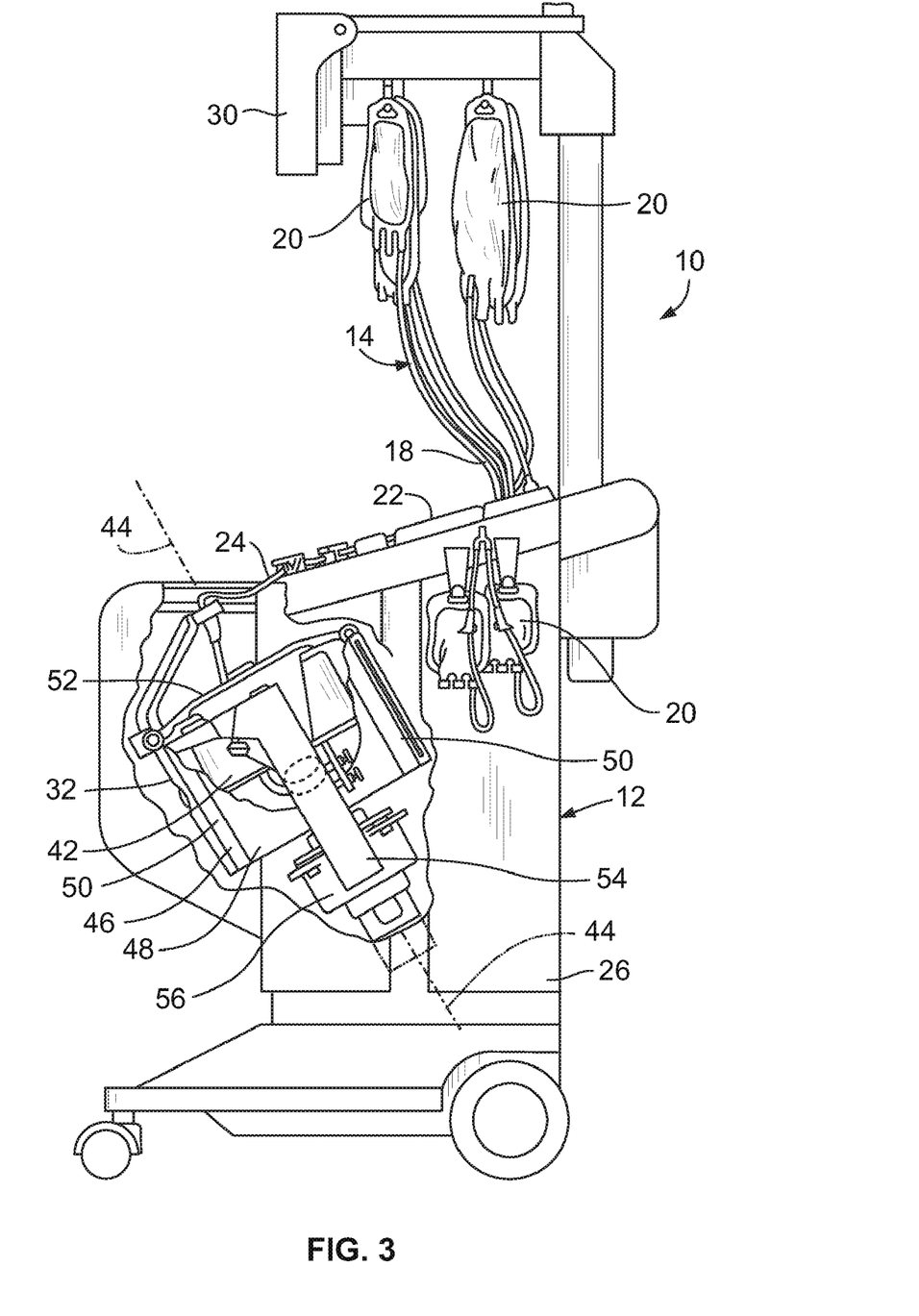
FIG. 3 is a side elevational view of the disposable fluid processing assembly of FIG. 2 mounted on the durable fluid processing system of FIG. 1, which is partially broken away.

The durable fluid processing system 10 is used in combination with a disposable processing set or fluid circuit 14, an example of which is shown in FIG. 2. FIG. 3 shows the disposable set 14 mounted on the durable system 10. The disposable set 14 is a preferably single use, disposable item loaded on the system 10 at the time of use. After a fluid processing procedure has been completed, the operator preferably removes the disposable set 14 from the system 10 and discards it.

The disposable set 14 includes a processing chamber 16 (FIG. 2). In use, the centrifuge assembly 12 rotates the processing chamber 16 to centrifugally separate blood components. Whole blood is conveyed to the processing chamber 16, and separated blood components are conveyed from the processing chamber 16, through a plurality of flexible tubes that form part of a fluid circuit 18. The fluid circuit 18 further includes a plurality of containers 20 that may be supported by elevated hangers located over the centrifuge assembly 12 (see FIG. 3) and that dispense and receive liquids during processing. Fluid flow through the fluid circuit 14 may be controlled in a variety of ways. Preferably, fluid flow is controlled via cassettes 22 with pre-formed fluid passageways, which may be selectively opened and closed pneumatically, hydraulically, or by movable actuators. The number of cassettes may vary, but in the illustrated embodiment, there are three cassettes 22, which operate in association with valve and pump stations on the centrifuge assembly 12 to direct liquid flow among multiple liquid sources and destinations during a blood processing procedure. Tubes connected to the processing chamber 16 lead to a flexible umibicus 24, with additional tubes at the other end of the umbilicus 24 fluidly connecting the processing chamber 16 (via the umbilicus 24) to the remainder of the disposable set 14, including the containers 20 and the cassettes 22. The umbilicus 24 will be described in greater detail herein. Advantageously, the disposable set 14 is a pre-assembled closed system, assuring an operator that it is a sterile unit.

As illustrated, the centrifuge assembly 12 includes a wheeled cabinet 26 that can be easily rolled from place to place. A user actuable processing controller 30 is provided which enables the operator to control various aspects of the blood processing procedure. A centrifuge rotor assembly 32 is provided behind a fold open door 34 that can be pulled open at the front of the cabinet 26 (FIG. 3). A plurality of valve and pump stations 36 (FIG. 1) are provided on the top face of the cabinet for receiving and controlling the various cassettes 22. A plurality of hooks or hangers 38 are provided on the cabinet 26 for suspending the various containers 20.

Figure 4:
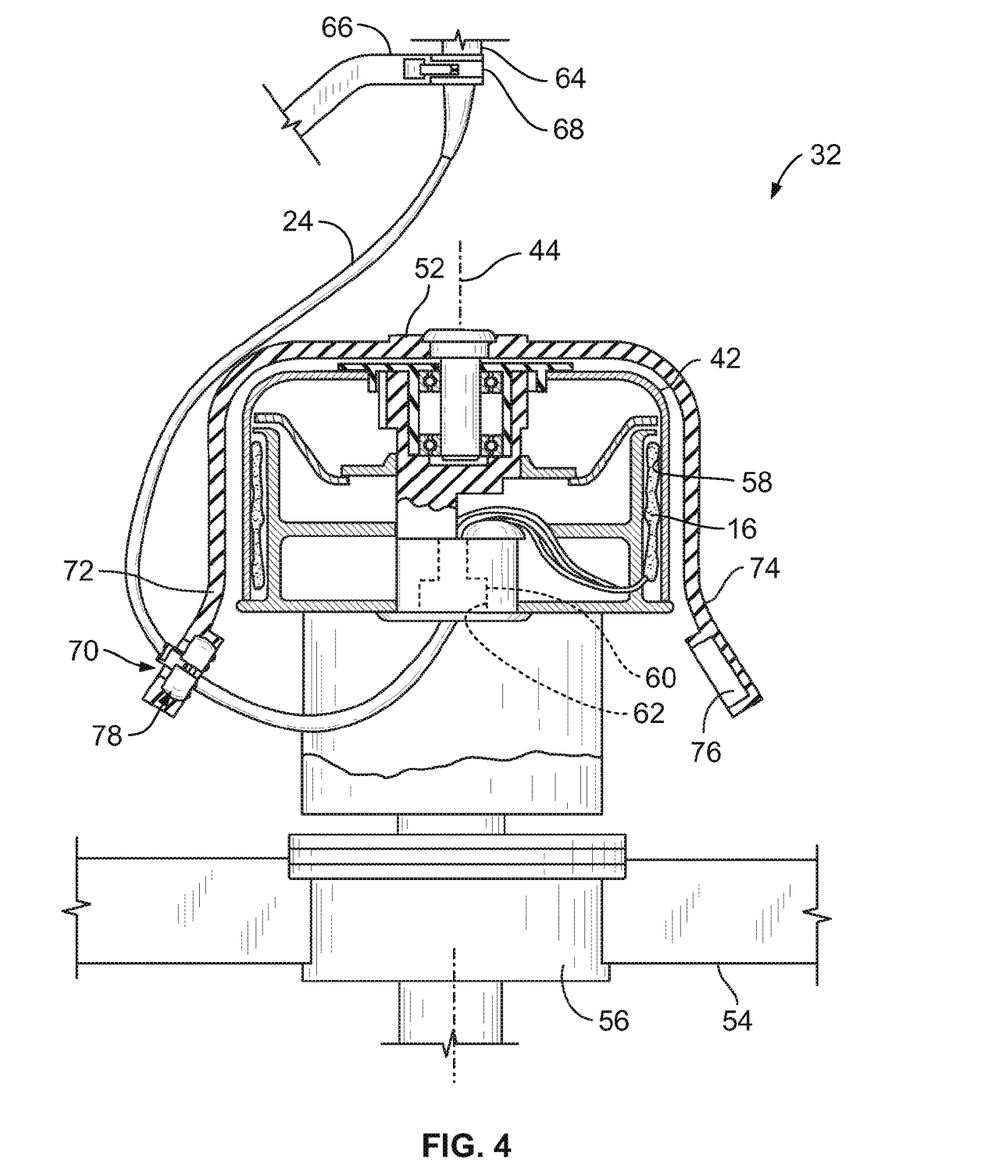
FIG. 4 is a side detail view of a centrifuge included in the durable fluid processing system of FIG. 1, showing the centrifuge in combination with an umbilicus of the disposable fluid processing assembly.

In use, the fold open door 34 is opened and the processing chamber 16 of the disposable set 14 is mounted in the centrifuge rotor assembly 32 (FIG. 4). The umbilicus 24 is threaded through the centrifuge rotor assembly 32 and out through an opening 40 in the upper panel of the cabinet 26 (FIG. 3). The cassettes 22 are snapped into respective ones of the valve and pump stations 36 and the containers 20 are hung from the appropriate hangers 38 (FIG. 3). After appropriate connections are made to the donor using known intravenous techniques, the operator enters appropriate commands on the processing controller 30 to begin the processing procedure.

Looking more closely at the centrifuge rotor assembly 32 (FIG. 4), it includes a chamber assembly 42 that is supported for rotation around an axis of centrifugation 44. The centrifuge further includes a centrifuge yoke assembly 46 that includes a yoke base 48, a pair of upstanding yoke arms 50, and a yoke cross member 52 mounted between the arms 50. The yoke base 48 is rotatably supported on a stationary platform 54 that carries the rotating mass of the centrifuge rotor assembly 32. The yoke base 48 is also supported for rotation around the axis of centrifugation independently of the chamber assembly 42. An electric drive 56 rotates the yoke assembly 46 relative to the stationary platform 54 around the axis of centrifugation 44. The chamber assembly 42 is free to rotate around the axis of centrifugation 44 at a rotational speed that is different from the rotational speed of the yoke assembly 46.

Referring further to FIG. 4, the chamber assembly 42 defines an annular chamber 58, centered around the axis of centrifugation 44, for receiving the processing chamber 16 of the disposable set 14. The umbilicus 24 extends through the lower center of the chamber assembly 42 in alignment with the axis of centrifugation 44. A first anchor portion 60 integrally molded or otherwise mounted onto the umbilicus 24, is received in a lowermost umbilicus mount 62 located at the lower center of the chamber assembly 42. The first anchor portion 60 and umbilicus mount 62 function to transfer torque between the umbilicus 24 and chamber assembly 42 so that the chamber assembly 42 rotates around the axis of centrifugation in response to twisting of the umbilicus 24 around its axis.

The other end of the umbilicus 24 is supported by means of a second anchor portion 64 that is removably received in an upper umbilicus mount 66 positioned over the centrifuge chamber assembly 42 substantially in alignment with the axis of centrifugation 44. An over-center clamp 68 at the end of the upper umbilicus mount 66 clamps onto the second anchor portion 64 to hold the adjacent segment of the umbilicus 24 rotationally stationary and in collinear alignment with the axis of centrifugation 44. The second anchor portion 64 may be integrally molded or otherwise securely joined with the umbilicus 24.

As further illustrated in FIG. 4, the portion of the umbilicus 24 between the second anchor portion 64 and the first anchor portion 60 is supported by a middle umbilicus mount or bearing support 70 (illustrated in greater detail in FIG. 5) that is carried at the lower end of a wing plate 72 extending outwardly and downwardly from the yoke cross member 52. As the electric drive 56 rotates the centrifuge yoke assembly 46 (FIG. 3) around the axis of centrifugation 44, the wing plate 72 and the bearing support 70 pull the midsection of the umbilicus 24 around the axis of centrifugation 44 as well. As the umbilicus 24 orbits around the axis 44, at rotational speed one-omega, a twisting action is imparted to the umbilicus 24 around its own axis. The midsection of the umbilicus 24 is free to rotate around its own axis relative to the wing plate 72 as the yoke assembly 46 is turned, so it will tend to "untwist" against the twisting motion imparted by the rotating yoke assembly 46. As it untwists in this manner, the umbilicus 24 spins the centrifuge chamber assembly 42 around the axis of centrifugation 44 at an average rotational speed of two-omega.

To maintain balance as the yoke assembly 46 turns, an additional wing plate 74 extends from the yoke cross member 52 diametrically opposite the wing plate 72. A counterweight 76 sufficient to balance the mass of the bearing support 70 and umbilicus 24 is carried on the lower end of the additional wing plate 74.

Figures 5, 6, 7:
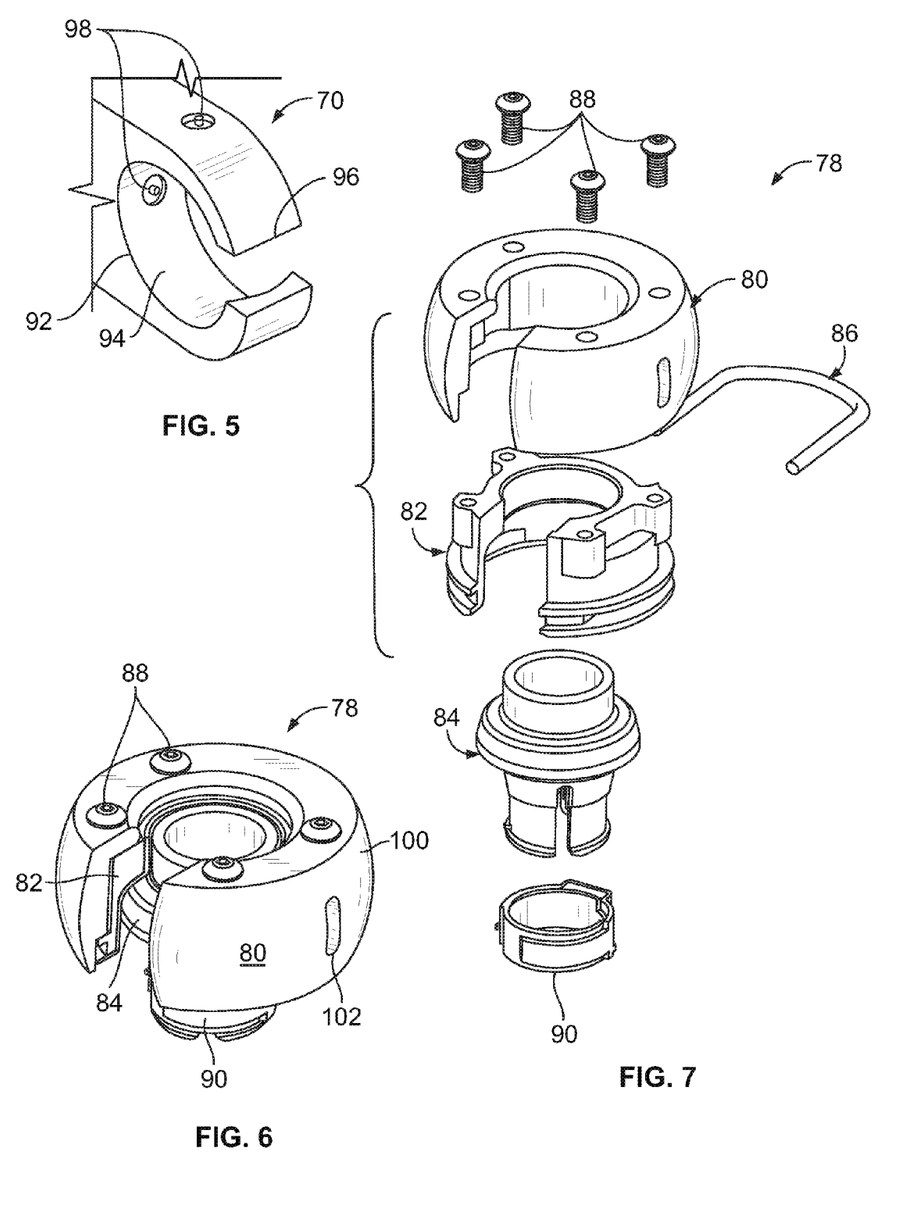
FIG. 5 is a perspective detail view of a bearing support of the centrifuge of FIG. 4.
FIG. 6 is a perspective view of an umbilicus bearing assembly according to an aspect of the present disclosure.
FIG. 7 is an exploded view of the umbilicus bearing assembly of FIG. 6.

In accordance with one aspect of the present disclosure, the midsection of the umbilicus 24 is supported on the wing plate 72 by means of an umbilicus bearing assembly 78, which is shown in greater detail in FIGS. 6 and 7. The illustrated umbilicus bearing assembly 78 includes, as illustrated, several distinct parts, one or more of which could be provided as integral combinations with other parts. Specifically, the illustrated assembly includes a gimbal or liner receptacle 80, a liner or bearing receptacle 82 at least partially received within the gimbal 80, a one-piece bearing 84 at least partially received within the liner 82, and a retaining member 86 which secures the bearing 84 within the liner 82. Additionally, fasteners 88 may be provided to secure the gimbal 80 to the liner 82 and a clip 90 in the form of a compression band or other suitable structure may be provided to secure the bearing 84 to the umbilicus 24.

The gimbal 80 of the umbilicus bearing assembly 78 is received within the bearing support 70, which is shown in greater detail in FIG. 5. The bearing support 70 comprises a circular opening 92 formed in the lowermost end of the wing plate 72. In the illustrated embodiment, the sidewall 94 of the circular opening 92 is concavely shaped, thereby giving the opening 92 a generally spherical shape. A gap 96 is formed in the end of the wing plate 72 and opens into the circular opening 92 to enable the umbilicus 24 and the umbilicus bearing assembly 78 to be inserted into the opening 92 from the side. A pair of orthogonally oriented pivot pins 98 extend from the sidewall 94 of the circular opening 92 towards its center.

Figure 8:
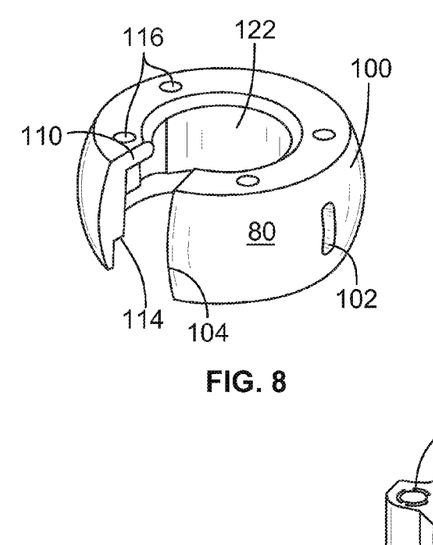
FIG. 8 is a perspective view of a gimbal of the umbilicus bearing assembly of FIG. 6.

The gimbal 80 (FIG. 8) comprises a "C-shaped" member having a generally annular or ring-like form. The outer surface 100 of the illustrated gimbal 80 is outwardly rounded or convex, thereby giving the gimbal 80 a generally spherical shape that matches the shape of the opening 92 of the bearing support 70. A pair of elongated slots 102 (only one of which is visible) are formed through the outer surface 100 and are positioned and dimensioned to receive the pivot pins 98 when the gimbal 80 is received in the circular opening 92. The rounded outer surface 100 of the gimbal 80, together with the slots 102 and pivot pins 98 received therein, enable the gimbal 80 to pivot within the circular opening 92 around two orthogonal axes. Such freedom of movement is referred to herein as a "gimbaling" action or motion. A gap 104 is formed through the side of the gimbal 80 to permit entry of the umbilicus 24. In one embodiment, the gimbal 80 is formed of a durable, rigid, low-friction plastic such as a Delrin® and/or polytetrafluoroethylene ("PTFE" or Teflon®). While such material is sufficiently rigid to prevent excessive wear during repeated use (the gimbal 80 being considered a part of the durable fluid processing system 10 and not the disposable set 14), it can be slightly flexed by pinching or squeezing (on account of the thickness of the gimbal wall and the presence of the gap 104) so as to be pressed into the circular opening 92 of the bearing support 70.

Similar to the gimbal 80, the liner or bearing receptacle 82 (FIGS. 9 and 10) comprises a generally "C-shaped" structure with a gap 106 opening through its side to permit passage of the umbilicus 24 during installation. As with the gimbal 80, the liner 82 is a reusable component of the umbilicus bearing assembly 78 which is intended for repeated use as part of the durable fluid processing system 10. Although shown as a separate part, the liner 82 could be integral and of one-piece construction with the gimbal 80. The combination of the gimbal 80 and liner 82 (whether provided separately or integrally) is referred to herein as a gimbal assembly.

Figure 11:
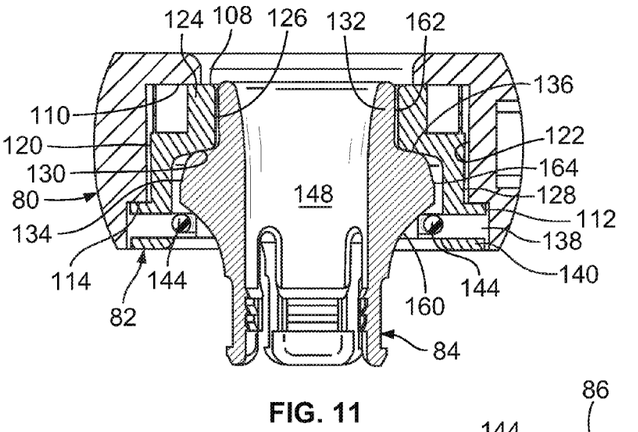
FIG. 11 is a cross-sectional view of the umbilicus bearing assembly of FIG. 6.

The liner 82 is configured to be at least partially received within the gimbal 80 (FIG. 11). In the illustrated embodiment, a top surface 108 of the liner 82 abuts an upper ledge or transverse wall 110 of the gimbal 80 when the liner 82 is properly positioned within the gimbal 80, thereby providing tactile feedback and a positive stop during assembly. The liner 82 may also include an upper rim 112 which simultaneously abuts a lower ledge or transverse wall 114 of the gimbal 80 when the liner 82 is properly positioned within the gimbal 80. Both the gimbal 80 and the liner 82 include one or more apertures 116, with each aperture 116 of the gimbal 80 being aligned with a corresponding aperture 116 of the liner 82 when the gap 104 of the gimbal 80 is aligned with the gap 106 of the liner 82. The apertures 116 so aligned each accommodates a fastener 88 (such as the threaded screws shown in FIGS. 6 and 7) to secure the liner 82 within the gimbal 80. The liner 82 may be secured to the gimbal 80 either before or after the gimbal 80 is installed within the circular opening 92 of the bearing support 70, though it may be advantageous to first install the gimbal 80 so that it is not necessary to squeeze both the gimbal 80 and the liner 82 upon installation of the gimbal 80 into the circular opening 92. It may be advantageous for there to be some amount of lateral clearance between the outer surface 120 of the liner 82 and the inner surface 122 of the gimbal 80. Such a space exposes the outer surface 120 of the liner 82 to the air within the centrifuge 32, thereby potentially reducing the temperature of the liner 82, which may tend to heat up during fluid processing as a result of friction, as will be described in greater detail herein.

Figure 10:
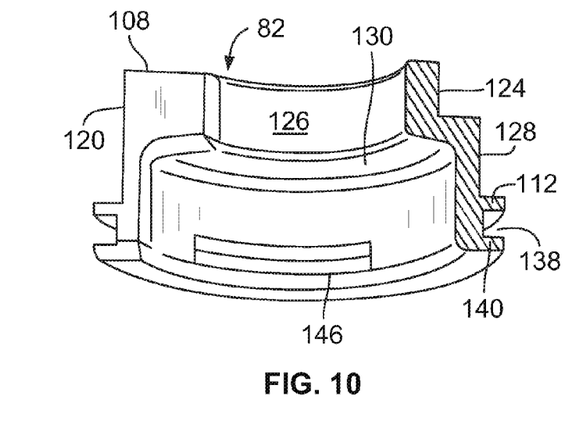
FIG. 10 is a cross-sectional perspective view of the liner of FIG. 9.

The illustrated liner 82 further includes an upper section 124 with a relatively small, substantially constant inner diameter (the surface of which is referred to herein as an axially-extending wall 126) and a lower section 128 with a relatively large, substantially constant inner diameter (FIG. 10). The transition between the upper section 124 and the lower section 18 is defined by a shoulder or radially-extending liner wall 130, which may extend substantially radially or at a selected angle or incline relative to the center axis. The opening defined by the upper section 124 of the liner 82 is adapted to receive a minor diameter portion 132 of the bearing 84, while the opening defined by the lower section 128 of the liner 82 is adapted to received a major diameter portion 134 of the bearing 84, as shown in FIG. 11. The shoulder 130 of the liner 82 abuts a mating bearing surface 136 of the bearing 84 to limit the degree to which the bearing 84 may be inserted into the liner 82 and to provide an arrangement that allows relative rotation between the bearing 84 and the liner 82, while limiting axial movement as a thrust bearing. Such a configuration of the inner surface of the liner 82 is adapted for use with the bearing 84 illustrated in FIGS. 7 and 11 and it should be understood that a different configuration for the liner inner surface may be more appropriate when the bearing configuration is different.

Figure 9:
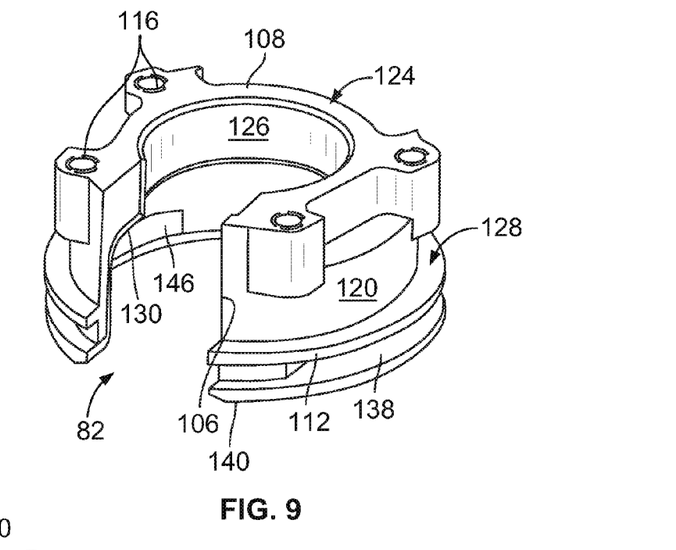
FIG. 9 is a perspective view of a liner that may be received within and form a portion of the gimbal or gimbal assembly of the umbilicus bearing assembly of FIG. 6.
Figure 12:
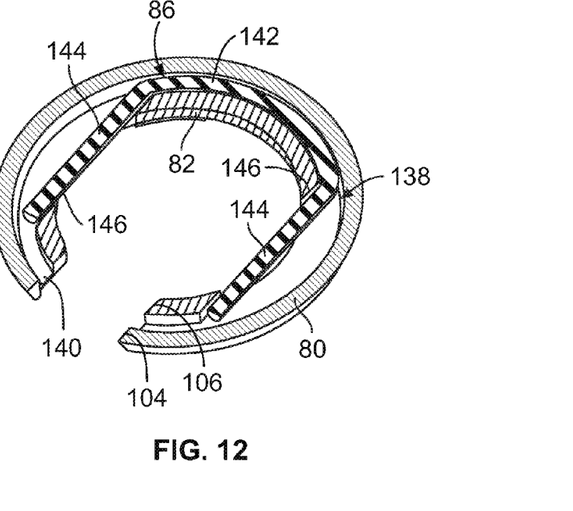
FIG. 12 is a perspective view of a portion of the gimbal, liner, and retaining member of the umbilicus bearing assembly of FIG. 6.

The liner 82 of FIGS. 9-11 also includes a generally "U-shaped" perimeter slot or channel or groove 138, which is defined between the upper rim 112 and a lower rim 140 adjacent to a bottom end of the liner 82. The channel 138 receives the retaining member 86, as shown in FIGS. 11 and 12. The illustrated retaining member 86 includes an arcuate crossbeam or cross member 142 (having a curvature substantially the same as the curvature of the channel 138) and a pair of substantially parallel legs 144 extending from the ends of the cross member 142. As shown in FIG. 12, the cross member 142 is positioned diametrically opposite the gap 106 of the liner 82, with the legs 144 extending from the cross member 142 in the direction of the gap 106. Two opposing lateral passages 146 (best shown in FIGS. 9 and 10) extend through the wall of the liner 82, allowing a portion of each leg 144 of the retaining member 86 to communicate with the open interior of the liner 82 (FIGS. 11 and 12). The major diameter portion 134 of the bearing 84 is wider than the separation between the legs 144 (FIG. 11), but the legs 144 are resilient (being made of a material such as stainless steel or spring steel or the like), thereby allowing the major diameter portion 134 of the bearing 84 to press the legs 144 away from each other as the bearing 84 is pressed into the liner 82. When the major diameter portion 134 has passed beyond the legs 144 and into the liner 82, the legs 144 will resiliently return to their original straight configuration (FIGS. 11 and 12), thereby temporarily securing the bearing 84 within the liner 82. Such a configuration provides a tactile and audible indication that the bearing 84 has been successfully loaded into the liner 82.

In one embodiment, the liner 82 is formed of a durable, high stiffness material such as stainless steel. A metallic material may be advantageous for drawing away from the bearing 84 any heat arising from friction generated between the liner 82 and the bearing 84 during fluid processing. Stainless steel may be particularly advantageous due to its low corrosion nature and ability to accept a wide range of coatings for further reducing friction between the interior of the liner 82 and the exterior of the bearing 84. Among such low-friction coatings are polyether ether ketone ("PEEK"), diamond-chrome, and nickel-boron nitride. A PEEK coating may be advantageous because of its low coefficient of friction, durability, and ability to withstand high temperatures. Hence, it may be most advantageous to provide the liner 82 as a stainless steel component having an inner surface which is at least partially coated with PEEK. However, other materials, including solid polymers, may also be used without departing from the scope of the present disclosure.

The one-piece bearing 84 (FIGS. 13 and 14) is generally tubular, with an inner lumen or surface 148 defining an open interior sufficiently sized to accommodate the umbilicus 24. During assembly of the disposable set 14, the bearing 84 is slid axially or longitudinally onto and along the umbilicus 24 to a position between the anchor portions 60, 64. The bearing 84 is slid into place before one or both of the anchor portions 60, 64 is associated with the umbilicus 24, otherwise the presence of the anchor portions 60, 64 would prevent proper positioning of the bearing 84. The bearing 84 is oriented with its minor diameter portion 132 facing the upper anchor portion 64 and an attachment portion or flange portion 150 facing the lower anchor portion 60. The location of the bearing 84 on the umbilicus 24 is referred to herein as a midsection of the umbilicus 24, although the bearing 84 is not necessarily located at the midpoint between the upper and lower anchor portions 64 and 60.

It may be advantageous for the inner diameter of the bearing 84 to be substantially the same as the outer diameter of the umbilicus 24 to ensure that the umbilicus 24 fits snugly around the bearing 84, thereby preventing radial or lateral movement of the umbilicus 24 within the bearing 84. It may also be advantageous for one end of the inner lumen 148 of the bearing 84 (illustrated in FIG. 11 as the top end) to be outwardly tapered to help guide the umbilicus 24 into the bearing 84 during assembly. Additionally, as the umbilicus 24 will tend to bend in the region of the bearing support 70 during fluid processing, such a taper provides a smooth surface to interface with a bending umbilicus 24, thereby reducing stress and easing the shear forces experienced by the bending umbilicus 24 at that location.

Figure 14:
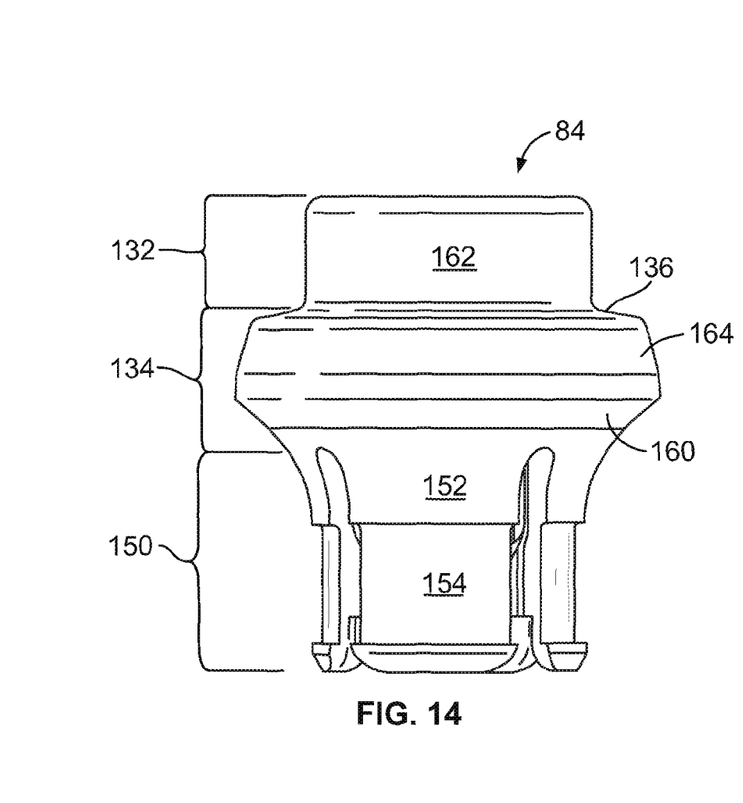
FIG. 14 is a front elevational view of the bearing of FIG. 13.
Figure 15:
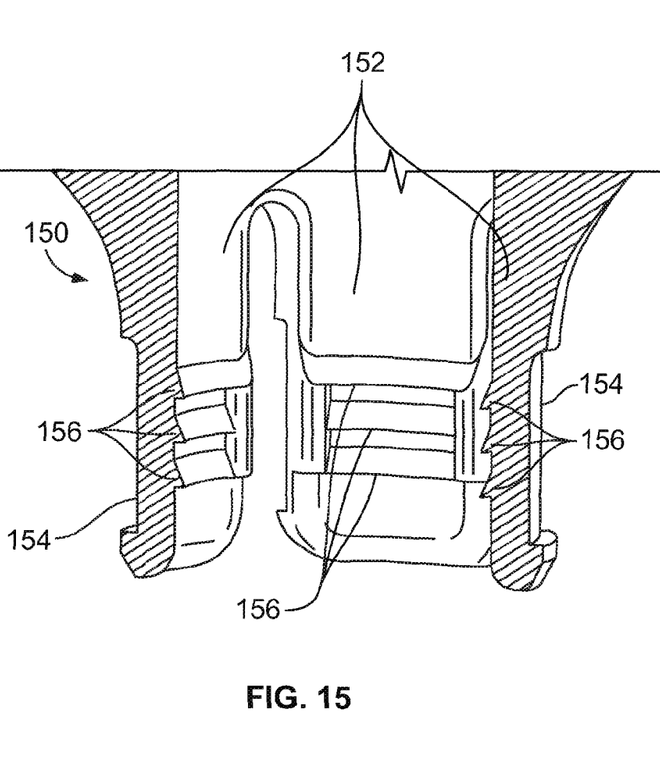
FIG. 15 is a cross-sectional perspective detail view of a retainer portion of the bearing of FIG. 13 for engaging or gripping an umbilicus (not shown) that extends through the bearing.
Figure 16:
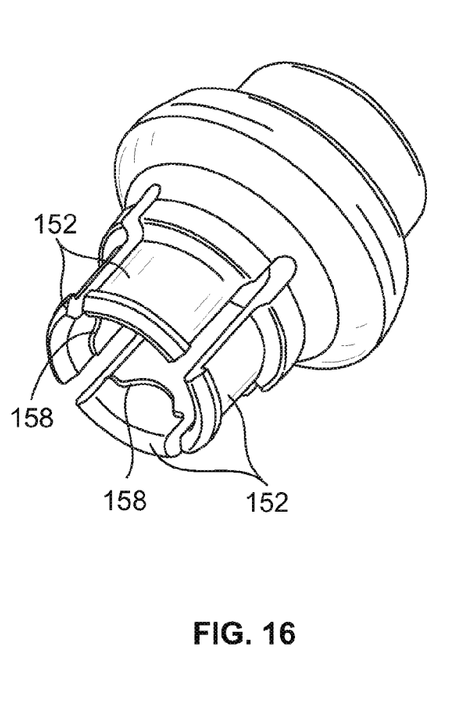
FIG. 16 is a perspective view of an alternative embodiment of a one-piece bearing according to the present disclosure.

The inner lumen 148 of the bearing 84 is held in place against the umbilicus 24 by any of a number of acceptable means, including an adhesive or other bonding agent and/or a physical restraint. In the embodiment illustrated in FIGS. 6 and 7, the bearing 84 is secured to the umbilicus 24 by means of a compression band or clip 90 (FIGS. 6 and 7). More particularly, the flange portion 150 of the bearing 84 (illustrated as a bottom end of the bearing 84 in FIGS. 13 and 14) includes a plurality of spaced-apart flanges or tabs 152 which can be forced radially inwardly toward a central axis of the bearing 84. Each flange 152 has an indentation 154 on its outer surface, which indentations 154 align to form an annular seat for the clip 90. The clip 90 has a smaller inner diameter than the lower end of the bearing 84, so when it is pushed into contact with the lower end of the bearing 84 (upwardly in the orientation of FIG. 7), it will force the flanges 152 radially inwardly, eventually seating within the indentations 154. The flanges 152 will grip the umbilicus 24, thereby preventing the bearing 84 from moving with respect to the umbilicus 24. The inner surfaces of the flanges 152 may include additional features to promote a secure grip by increasing the force required to cause the bearing 84 to slip axially along the umbilicus 24. For example, FIG. 15 shows one embodiment wherein the inner surface of each flange 152 includes a traction feature comprised of a plurality of parallel projections or barbs 156 which are oriented transverse to the central axis of the bearing 84. In another embodiment, shown in FIG. 16, the inner surface of each flange 152 includes a traction member comprising a single "U-shaped" barb 158. Other barb configurations may also be employed without departing from the scope of the present disclosure. Other surface treatments could also be used to enhance friction between the bearing 84 and umbilicus 24.

Figure 13:
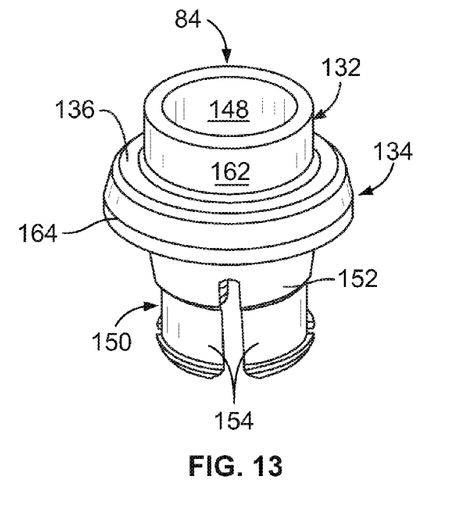
FIG. 13 is a perspective view of the one-piece bearing of the umbilicus bearing assembly of FIG. 6.

Turning now to the outer surface of the one-piece bearing 84, the illustrated embodiment is comprised of three sections—the minor diameter portion 132, the above-described flange or attachment portion 150, and the major diameter portion 134, which is positioned between the minor diameter portion 132 and the flange portion 150. The transition from the minor diameter portion 132 to the major diameter portion 134 is defined by the radially-extending bearing surface 136, which acts as a thrust bearing in an axial direction and will be described in greater detail herein. The transition from the major diameter portion 134 to the flange portion 150 is defined by a lead-out surface 160 which will be described in greater detail herein.

The minor diameter portion 132 is substantially tubular, with an outer surface 162 configured to be received within the opening defined by the axially-extending wall 126 of the liner 82 (FIG. 11). The outer surface 162 of the minor diameter portion 132 is referred to herein as an axially-extending bearing surface and is acted on by radial forces, as will be described in greater detail herein. In the illustrated embodiment, the diameter of the axially-extending bearing surface 162, while being smaller than the diameter of the axially-extending liner wall 126, is comparable to the diameter of the axially-extending liner wall 126. Such a configuration has a number of benefits. For example, it prevents the axially-extending bearing surface 162 from binding within the axially-extending liner wall 126. At the same time, the diameters of the axially-extending liner wall 126 and axially-extending bearing surface 162 are sufficiently close that the axially-extending bearing surface 162 is only allowed a small amount of lateral travel before coming into contact with the axially-extending liner wall 126. This ensures that the bearing 84 remains generally coaxial with the liner 82 during fluid processing for optimal performance.

As for the illustrated major diameter portion 134, it is comprised of the radially-extending bearing surface 136, a lead-in surface 164, and the lead-out surface 160. The illustrated radially-extending bearing surface 136 extends from the axially-extending bearing surface 162 in a direction generally away from the central axis of the bearing 84. in use, the radially-extending bearing surface 136 abuts the shoulder 130 of the liner 82 (FIG. 11), with the two being oriented at approximately the same angle to maximize the surface contact therebetween. Such a configuration has a number of benefits. For one, it gives the bearing 84 a self-centering feature with respect to the liner 82. Further, during use the liner 82 presses against the bearing 84 with an axial force, but an inclined interface therebetween gives the force a radial component, which effectively reduces the magnitude of the force in the axial direction. In the illustrated embodiment, the shoulder 130 and radially-extending bearing surface 136 are inclined and oriented approximately 10° from horizontal, sloping away from the associated axially-extending liner wall 126 and axially-extending bearing surface 162, respectively. While the illustrated angle for the radially-extending bearing surface 136 and the shoulder 130 has been found to be advantageous, other configurations and angles may also be employed without departing from the scope of the present disclosure.

The illustrated lead-in surface 164 extends from an outer end of the radially-extending bearing surface 136 and extends radially outwardly therefrom. As shown in FIG. 11, the lead-in surface 164 is oriented at a sharper incline than the radially-extending bearing surface 136. As best illustrated in FIG. 11, the maximum diameter of the radially-extending bearing surface 136 is approximately equal to or slightly smaller than the separation between the legs 144 of the retaining member 86. Thus, upon pressing the bearing 84 into the liner 82, the radially-extending bearing surface 136 will pass into the liner 82 without contacting the legs 144 of the retaining member 86. The lead-in surface 164, however, is wider than the separation between the legs 144, so it will contact the legs 144 as the bearing 84 is pressed into the liner 82. Rather than getting caught upon the legs 144, the incline of the lead-in surface 164 gradually presses the legs 144 away from each other and allows the lead-in surface 164 to pass beyond the legs 144 and into the liner 82.

The inclination of the lead-in surface 164 may be varied to determine the force required to press the bearing 84 into the liner 82, with greater inclination (i.e., closer to parallel with the central axis of the bearing 84) tending to allow the bearing 84 to be loaded into the liner 82 at a lower insertion force. For example, in one embodiment the inclination of the lead-in surface 164 is approximately 15° from parallel with the central axis of the bearing 84. Such an inclination is sufficiently great that the bearing 84 can be automatically loaded into the liner 82 upon rotation of the umbilicus 24 as part of a fluid processing procedure. It should be noted that, while reference is made to the lead-in surface 164 having an inclination, its configuration is not limited to a strict frusto-conical shape with a uniform inclination. In particular, the illustrated embodiment has a lead-in surface 164 which is slightly parabolic or defined by a compound angle. Other configurations of the lead-in surface 164 may also be employed without departing from the scope of the present disclosure.

The outer edge of the lead-in surface 164 marks the transition between the lead-in surface 164 and the lead-out surface 160. In contrast to the lead-in surface 164, the lead-out surface 160 is inwardly inclined or tapered (i.e., having an outer diameter which decreases as the bearing 84 is inserted into the liner 82). When the lead-in surface 164 has fully passed beyond the legs 144 of the retaining member 86 and the outer diameter of the bearing 84 begins to decrease (i.e., in the region of the lead-out surface 160), the legs 144 begin to resiliently return to their original straight configuration, pressing toward each other and against the lead-out surface 160. At this point, the bearing 84 is temporarily secured within the liner 82, as the lead-out surface 160 cannot exit the liner 82 without being pulled (to press the legs 144 of the retaining member 86 far enough apart from each other so as to allow passage of the lead-out surface 160).

In the illustrated embodiment, the lead-out surface 160 defines a greater angle to the central axis of the bearing 84 than the lead-in surface 164, meaning that it will be easier to insert the bearing 84 into the liner 82 than to remove the bearing 84 from the liner 82. For example, in one embodiment, the lead-in surface 164 is inclined at approximately 15° (from parallel with the central axis of the bearing 84), while the lead-out surface 160 is inlined at approximately 45°. Such a configuration for the lead-out surface 160 may be advantageous, as it causes the legs 144 of the retaining member 86 to quickly "snap" back toward their original straight configuration, providing a tactile and audible indication that the bearing 84 has been successfully loaded into the liner 82. Also in the illustrated embodiment, the lead-out surface 160 is tapered to a small enough outer diameter that the legs 144 of the retaining member 86 will be returned to their original straight configuration when the bearing 84 has been loaded within the liner 82 (FIG. 11). This may be advantageous for a number of reasons (including improving the durability of the retaining member 86), but in other embodiments the lead-out surface 160 may only allow for a partial return of the legs 144 of the retaining member 86 to their original straight configuration upon full insertion of the bearing 84 into the liner 82.

The function of an umbilicus bearing assembly is to associate the umbilicus to the bearing support while allowing the umbilicus to rotate about its own central axis in the region of the bearing support. In contrast to known umbilicus bearing assemblies which employ ball bearings to permit rotation of the bearing (and, hence, the umbilicus) with respect to the liner, the one-piece bearing 84 of the present disclosure (particularly the radially-extending bearing surface 136 and the axially-extending bearing surface 162) effectively slides against the liner 82 for relative rotation. Accordingly, it is advantageous for the bearing 84 to be comprised of a material having a low coefficient of friction, thereby minimizing the amount of heat generated during use while also ensuring that the umbilicus 24 is free to rotate about its own central axis (as any binding of the bearing 84 within the liner 82 can cause undesirable torsion of the umbilicus 24 during fluid processing). Additional material characteristics of the bearing 84 may also be advantageous. For example, it may be advantageous for the material used to be resistant to abrasion and sufficiently rigid or hard so as to withstand (without deformation) the forces exerted upon the bearing 84 during fluid processing. Another advantageous characteristic is a high melt temperature, which prevents wear and softening of the bearing 84 upon reaching the maximum temperature and load during fluid processing. Typically, the disposable set 14 (including the bearing 84) is sterilized prior to use by way of an electron-beam or gamma sterilization process, in which case it would be advantageous for the bearing material to be able to withstand such a sterilization process without excessive degradation.

Generally speaking, it has been found that a material having a relatively high density will be suitable for use in forming the one-piece bearing 84. More particularly, it has been found that selected polyesters (especially reinforced polyesters) have the desired mechanical characteristics and would perform suitably. Within the family of reinforced polyesters, thermoplastic crystalline polymers may perform particularly well due to their high formability with minimal shrinkage, greater dimensional accuracy and endurance, high rigidity and mechanical strength, high heat stability, and very low electrical conductivity (to minimize the potential for static energy build up during rotation of the umbilicus 24). In one embodiment, the bearing 84 is injection molded as a single piece using the thermoplastic crystalline polymer polybutylene terephthalate (PBT). It may be advantageous for the polymer base material to include an additive to raise the flexural modulus and heat resistance and to provide increased lubricity. When using a PBT base material, suitable fillers include (but are not limited to) one or more of: aramid fiber, PTFE/Teflon®, silicone oil or gum, and PEEK. These fillers could work well in varying concentrations to produce the desired results, including ease in injection moldability and high stiffness. In one exemplary formulation, the bearing material is comprised of approximately 80% PBT, 18% PTFE, and 2% silicone oil or gum.

Alternatively, the material composition of the liner 82 and the bearing 84 may be reversed. For example, the liner 82 may be a molded component comprised of a polymeric material, such as a PBT base material with a filler material (e.g., PTFE and/or silicone oil or gum), while the bearing 84 may be comprised of a metallic material, such as stainless steel with a PEEK coating.

Figure 17:
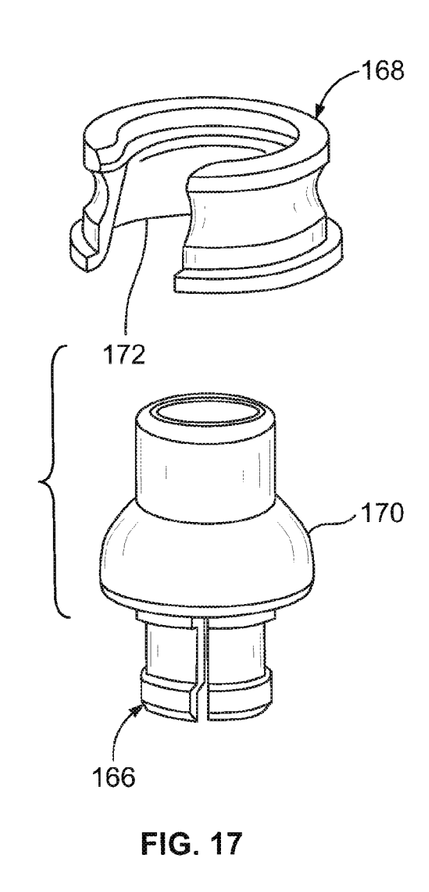
FIG. 17 is an exploded view of an alternative embodiment of a one-piece bearing and gimbal liner according to the present disclosure.
Figure 18:
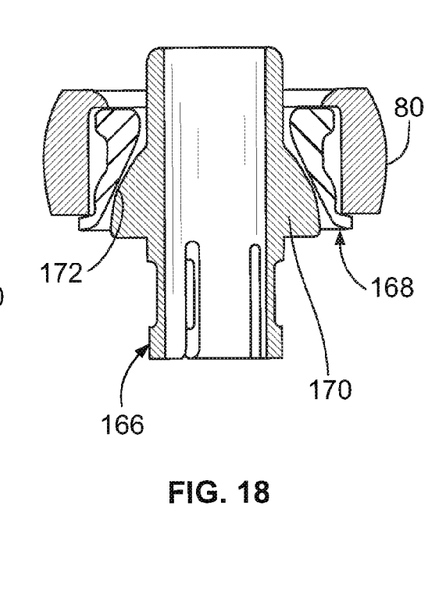
FIG. 18 is a cross-sectional view of the bearing and liner of FIG. 17 mounted within a gimbal.

An alternative embodiment of a bearing 166 and associated liner 168 according to the present disclosure is shown in FIG. 17, with FIG. 18 showing the bearing 166 and liner 168 being mounted within a gimbal 80 according to the foregoing description. The bearing 166 of FIG. 17 is substantially the same as the bearing 84 of FIGS. 13 and 14, except for a different major diameter portion 170. Rather than having a radially-extending bearing surface 136, lead-in surface 164, and lead-out surface 160, the major diameter portion 170 of the bearing 166 of FIG. 17 has a generally hemispherical outer surface. To accommodate such a bearing 166, the inner surface 172 of the liner 168 defines a generally conical or paraboloid open interior (FIG. 18). As in the previous embodiment, the outer surface of the bearing 166 (particularly the major diameter portion 170) directly engages the inner surface 172 of the liner 168 and effectively slides against the liner 168 for relative rotation.

The embodiment of FIGS. 17 and 18 also differs from the previous embodiment in that it omits a retaining member or other means for temporarily securing the bearing 166 within the liner 168. As described previously, bearings according to the present disclosure may have a self-loading function and the bearing, once loaded (whether manually or automatically), will remain in the liner during fluid processing due to the motion of the umbilicus 24, the forces exerted upon the umbilicus 24, and the simple configuration of the bearing and liner. Accordingly, while a retaining member provides additional security and assurance that the bearing is properly loaded in the liner, it is not required. Hence, it should be understood that the embodiment of FIGS. 6 and 7 may be practiced without the retaining member 86 and that the embodiment of FIGS. 17 and 18 may be practiced with a retaining means.

Prior to an operator beginning a fluid processing procedure, the gimbal 80 and liner 82, 168 (being part of the durable fluid processing system 10) are already in place within the bearing support 70 and the bearing 84, 166 is already secured to the midsection of the umbilicus 24 at the appropriate location. The operator associates the various components of the disposable set 14 with the corresponding components of the fluid processing system 10 (e.g., hanging the containers 20 on the designated hangers 38 and inserting each cassette 22 into the appropriate valve and pump station 36). The user folds open the door 34 to gain access to the centrifuge rotor assembly 32 (FIGS. 3 and 4). The user places the processing chamber 16 in the annular chamber 58 and clamps the anchor portions 60 and 64 of the umbilicus 24 into their designated mounts 62 and 66. The umbilicus 24 is inserted sideways through the aligned gaps 96, 104, and 106 of the bearing support 70, gimbal 80, and liner 82, 168, with the bearing 84, 166 being positioned on the liner side of the bearing support 70 (as opposed to the gimbal side of the bearing support 70). The bearing 84, 166 can then be either pressed into the liner 82, 168 or left in place to allow for an automatic loading during fluid processing.

One the disposable set 14 is in place, the operator may proceed in carrying out a fluid processing procedure (inputting instructions into the controller 30, phlebotomizing a subject, etc.) according to known methods.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the one-piece bearing alone, multiple components of the umbilicus bearing assembly, one or more components of the umbilicus bearing assembly in a larger fluid processing assembly, and/or methods for manufacturing, loading, and/or using the same.

The invention claimed is:

1. A fluid circuit for use with a fluid processing assembly having a bearing support and a gimbal assembly received within the bearing support, the fluid circuit comprising:
   an umbilicus having a first end and a second end; and
   a one-piece thrust bearing secured to the umbilicus at a location between the ends and adapted to be at least partially received within the gimbal assembly, the bearing including
      an inner lumen which directly engages the umbilicus and includes a formed traction feature, which bears against the umbilicus to prevent relative rotation of the bearing and the umbilicus and
      an outer surface including a bearing surface adapted to engage at least a portion of the gimbal assembly for sliding rotation relative to the gimbal assembly.

2. The fluid circuit of claim 1, wherein
   the bearing is adapted to be temporarily secured to the gimbal assembly by longitudinal relative movement of the bearing and/or the gimbal assembly toward each other and
   the outer surface of the bearing includes a lead-in surface adapted to contact a retaining member associated with the gimbal assembly when the bearing is moved into the gimbal assembly and to pass beyond the retaining member and into the gimbal assembly.

3. The fluid circuit of claim 2, wherein the lead-in surface is adapted to automatically contact and move beyond the retaining member and into the gimbal assembly during a fluid processing procedure.

4. The fluid circuit of claim 1, wherein
   the bearing is adapted to be disassociated from the gimbal assembly by longitudinal relative movement of the bearing and/or the gimbal assembly away from each other and
   the outer surface of the bearing includes a lead-out surface adapted to contact a retaining member associated with the gimbal assembly when the bearing is moved out of the gimbal assembly and to pass beyond the retaining member and out of the gimbal assembly.

5. The fluid circuit of claim 1, wherein
   the bearing is adapted to be temporarily secured to the gimbal assembly by longitudinal relative movement of the bearing and/or the gimbal assembly toward each other and to be disassociated from the gimbal assembly by longitudinal relative movement of the bearing and/or the gimbal assembly away from each other and
   the outer surface of the bearing includes
      a lead-in surface adapted to contact a retaining member associated with the gimbal assembly when the bearing is moved into the gimbal assembly and to pass beyond the retaining member and into the gimbal assembly and
      a lead-out surface adapted to contact the retaining member when the bearing is moved out of the gimbal assembly and to pass beyond the retaining member and out of the gimbal assembly.

6. The fluid circuit of claim 5, wherein the lead-out surface defines a greater angle to a central axis of the bearing than the lead-in surface.

7. The fluid circuit of claim 1, wherein the bearing is substantially comprised of polybutylene terephthalate; a combination including polybutylene terephthalate and polytetrafluoroethylene; a combination including polybutylene terephthalate and silicone oil or gum; or a combination including polybutylene terephthalate, polytetrafluoroethylene, and silicone oil or gum.

8. The fluid circuit of claim 1, wherein the bearing includes a minor diameter portion adapted to contact the gimbal assembly to maintain the bearing in substantially coaxial relationship thereto and a major diameter portion adapted to contact the gimbal assembly to transmit a substantially axial force therebetween.

9. The fluid circuit of claim 1, wherein the outer surface of the bearing includes a generally hemispherical portion adapted to contact the gimbal assembly.

10. The fluid circuit of claim 1, wherein the bearing surface has a shape complementary to said at least a portion of the gimbal assembly.

11. The fluid circuit of claim 1, wherein the inner lumen of the bearing includes an outwardly tapered portion.

12. The fluid circuit of claim 1, wherein the traction feature comprises a barb extending from the inner lumen of the bearing toward the central axis of the bearing.

13. The fluid circuit of claim 12, wherein
   the bearing includes a flange portion having a plurality of flanges,
   at least one of the flanges includes the barb,
   each flange includes an outer surface having an indentation,
   the indentations define an annular seat, and
   a clip is at least partially received within the annular seat to urge the barb into contact with the umbilicus.

14. A fluid circuit for use with a fluid processing assembly having a bearing support and a gimbal assembly received within the bearing support and having an inner surface comprising an axially-extending wall generally coaxial with a central axis of the gimbal assembly and a radially-extending wall extending generally away from the central axis of the gimbal assembly, the fluid circuit comprising:
- an umbilicus having a first end and a second end; and
- a one-piece thrust bearing secured to the umbilicus at a location between the ends and adapted to be at least partially received within the gimbal assembly and comprising
  - an inner lumen through which the umbilicus extends and
  - an outer surface adapted to engage at least a portion of the gimbal assembly for sliding rotation relative to the gimbal assembly and comprising
    - an axially-extending bearing surface adapted to engage at least a portion of the axially-extending wall of the gimbal assembly, and
    - a radially-extending bearing surface adapted to engage at least a portion of the radially-extending wall of the gimbal assembly and oriented at an angle with respect to a radius from a central axis of the bearing.

15. The fluid circuit of claim 14, wherein the bearing is substantially comprised of polybutylene terephthalate; a combination including polybutylene terephthalate and polytetrafluoroethylene; a combination including polybutylene terephthalate and silicone oil or gum; or a combination including polybutylene terephthalate, polytetrafluoroethylene, and silicone oil or gum.

16. The fluid circuit of claim 14, wherein the inner surface of the bearing includes a traction feature which bears against the umbilicus to prevent relative rotation of the bearing and the umbilicus.

17. The fluid circuit of claim 16, wherein the traction feature comprises a barb extending from the inner lumen of the bearing toward the central axis of the bearing.

18. The fluid circuit of claim 17, wherein
- the bearing includes a flange portion having a plurality of flanges,
- at least one of the flanges includes the barb,
- each flange includes an outer surface having an indentation,
- the indentations define an annular seat, and
- a clip is at least partially received within the annular seat to urge the barb into contact with the umbilicus.

19. The fluid circuit of claim 14, wherein the outer surface of the bearing has a shape complementary to said at least a portion of the gimbal assembly.

20. The fluid circuit of claim 14, wherein the inner lumen of the bearing includes an outwardly tapered portion.

* * * * *